United States Patent
Tamura (10) Patent No.: US 8,977,118 B2
(45) Date of Patent: Mar. 10, 2015

(54) VARIABLE MAGNIFICATION VIEWFINDER DEVICE AND METHOD FOR CHANGING LUMINANCE OF DISPLAYED INFORMATION

(71) Applicant: FUJIFILM Corporation, Tokyo (JP)

(72) Inventor: Kazunori Tamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/256,548

(22) Filed: Apr. 18, 2014

(65) Prior Publication Data

US 2014/0226054 A1 Aug. 14, 2014

Related U.S. Application Data

(63) Continuation of application No. PCT/JP2012/072722, filed on Sep. 6, 2012.

(30) Foreign Application Priority Data

Oct. 19, 2011 (JP) .................................. 2011-229567

(51) Int. Cl.
*G03B 17/20* (2006.01)
*G03B 13/02* (2006.01)
(Continued)

(52) U.S. Cl.
CPC ................ *G03B 13/10* (2013.01); *G03B 13/12* (2013.01); *G03B 17/20* (2013.01); *H04N 5/23293* (2013.01)
USPC ........... 396/296; 396/374; 396/379; 396/382; 396/384; 348/333.01; 348/333.02; 348/333.09

(58) Field of Classification Search
CPC ........ G03B 13/10; G03B 13/12; G03B 17/20; H04N 5/23293

USPC ........... 396/296, 373, 374, 379, 382, 384, 84, 396/148; 348/333.08, 333.01, 333.02, 348/333.09, 341

See application file for complete search history.

(56) References Cited

U.S. PATENT DOCUMENTS

| 5,107,334 | A | * | 4/1992 | Matsumoto | 348/561 |
| 5,617,170 | A | * | 4/1997 | Watanabe et al. | 396/378 |
| 2013/0093799 | A1 | * | 4/2013 | Choi et al. | 345/690 |

FOREIGN PATENT DOCUMENTS

| JP | 3-140930 A | 6/1991 |
| JP | 8-43918 A | 2/1996 |

(Continued)

OTHER PUBLICATIONS

An English translation of the International Preliminary Report on Patentability for Application No. PCT/JP2012/072722, mailed Apr. 24, 2014.

(Continued)

*Primary Examiner* — Rochelle-Ann J Blackman
(74) *Attorney, Agent, or Firm* — Birch, Stewart, Kolasch & Birch, LLP (57) ABSTRACT

In a variable magnification viewfinder device, information displayed on a liquid crystal panel and a viewfinder image are combined with each other through a prism. When a variable power lens is inserted in a viewfinder optical path, viewfinder magnification is changed. Based on the change in the viewfinder magnification, brightness of a backlight unit is changed and luminance of the information displayed on the liquid crystal panel is changed. In a viewfinder field of view, the information and the viewfinder image are displayed at substantially the same brightness.

10 Claims, 9 Drawing Sheets

(51) Int. Cl.
*G03B 13/06* (2006.01)
*G03B 13/10* (2006.01)
*H04N 5/222* (2006.01)
*G03B 13/12* (2006.01)
*H04N 5/232* (2006.01)

(56) References Cited

FOREIGN PATENT DOCUMENTS

| JP | 11-153827 A | 6/1999 |
| JP | 2000-89337 A | 3/2000 |
| JP | 2004-165934 A | 6/2004 |

OTHER PUBLICATIONS

International Search Report issued in PCT/JP2012/072722 mailed Oct. 16, 2012.

Written Opinion of the International Searching Authority issued in PCT/JP2012/072722 mailed Oct. 16, 2012.

* cited by examiner

VARIABLE MAGNIFICATION VIEWFINDER DEVICE AND METHOD FOR CHANGING LUMINANCE OF DISPLAYED INFORMATION

CROSS REFERENCE TO RELATED APPLICATIONS

This application is a continuation of PCT International Application No. PCT/JP2012/072722 filed on Sep. 6, 2012, which claims the benefit of Patent Application No. 2011-229567 filed on Oct. 19, 2011. The entire contents of all of the above applications are hereby expressly incorporated by reference into the present application.

BACKGROUND OF THE INVENTION

1. Field of the invention

The present invention relates to a variable magnification viewfinder device capable of changing viewfinder magnification and a method for changing luminance of information displayed in a viewfinder.

2. Description Related to the Prior Art

Digital cameras which convert an optical image into an electric signal by the use of an image sensor such as a CCD image sensor and store the electric signal as image data in a memory card or the like are widely used. Most of the digital cameras are provided with an LCD panel on the back. The LCD panel allows checking a subject image (through image) to be taken and reproduction and display of an image which has been recorded in the memory card.

Image capture with the digital camera is often performed outdoors under daylight. It may be hard to see an image on the LCD panel depending on a direction of outdoor light. A digital camera provided with a window-type viewfinder device in addition to the LCD panel is commercially available. There are optical window-type viewfinders, with which a subject is directly observed through a viewfinder optical system, and electronic window-type viewfinders, in which an electronic display panel such as a liquid crystal panel or an organic EL is disposed to display an image (through image) of a subject.

Taking lenses include fixed lenses and interchangeable lenses. The fixed lens is fixed to a camera body. The interchangeable lens is attached to the camera body in a removable manner. Furthermore, the taking lenses include fixed-focus lenses and variable power lenses including zoom lenses. The focal length of the fixed-focus lens is invariable. The focal length of the variable power lens is changeable. The camera using the interchangeable lens and/or the variable power lens captures images at various focal lengths. Hence, it is preferable that the viewfinder device is also adaptable to the focal lengths. Optical viewfinder devices each with visual field frames corresponding to different focal lengths and variable magnification viewfinder devices capable of adjusting viewfinder magnification are known. Optical viewfinder devices which display imaging conditions, for example, information of an f-number that represents brightness of the taking lens, the focal length of the taking lens, the shutter speed, and the imaging distance in the viewfinder field of view are also known. For example, Japanese Patent Laid-Open Publication No. 8-43918 discloses an optical viewfinder device which displays information such as a focus state of a taking lens on an LCD to allow viewing the displayed information through a viewfinder.

The optical viewfinder device disclosed in the Japanese Patent Laid-Open Publication No. 8-43918 changes brightness of the viewfinder field of view as the viewfinder magnification changes. Thereby the inside of the viewfinder is lighted or darkened. However, brightness of the displayed information such as characters on the LCD does not change, so that it may become difficult to read the information or the information may even become illegible. The brightness of the viewfinder field of view suddenly changes particularly in the variable magnification viewfinder device in which the viewfinder magnification is changed by inserting or retracting the variable power lens into or from the viewfinder optical path. The sudden change in the brightness makes illegibility of the displayed information noticeable.

SUMMARY OF THE INVENTION

An object of the present invention is to provide a variable magnification viewfinder device and a method for changing luminance of displayed information, capable of preventing displayed information from being illegible when viewfinder magnification is changed.

In order to achieve the above and other objects, the variable magnification viewfinder device of the present invention comprises a variable magnification viewfinder optical system, an electronic display panel, an optical path member, and a luminance changing section. The variable magnification viewfinder optical system is provided independently from an imaging system which comprises a taking lens and a solid state image sensor. The variable magnification viewfinder optical system inserts or retracts a variable power lens into or from a viewfinder optical path between an objective lens and an eyepiece lens in an interlocking manner with an operation for changing a magnification of the taking lens and thereby changes a viewfinder magnification stepwise. The electronic display panel displays information related to imaging. The optical path member introduces the information displayed on the electronic display panel to a viewfinder field of view from a position closer to the eyepiece lens than a position at which the variable power lens is inserted or retracted and thereby combines the viewfinder image with the displayed information. The luminance changing section automatically changes luminance of the information displayed on the electronic display panel, in accordance with a change in the viewfinder magnification.

It is preferable that the luminance changing section reduces the luminance of the information displayed on the electronic display panel as the viewfinder magnification increases.

It is preferable that the luminance changing section allows displaying viewfinder magnification information with set luminance, which is determined stepwise in accordance with the viewfinder magnification, on the electronic display panel before and after the change in the viewfinder magnification. It is preferable that the luminance changing section allows displaying the viewfinder magnification information with luminance higher than any of the set luminances while the viewfinder magnification is changed. It is preferable that the electronic display panel displays the viewfinder magnification information at a predetermined display size before and after the change in the viewfinder magnification. It is preferable that the electronic display panel displays at least a part of the viewfinder magnification information at a size larger than the predetermined display size while the viewfinder magnification is changed.

It is preferable that the optical path member is a prism disposed between the objective lens and the eyepiece lens. The prism combines the displayed information with a viewfinder image formed by the objective lens.

It is preferable that the luminance changing section makes the luminance of the information, which is displayed on the electronic display panel, higher than luminance before the change in the viewfinder magnification and luminance after the change in the viewfinder magnification, while the viewfinder magnification is changed. It is preferable that the electronic display panel makes a size of at least a part of the information, which is displayed in the viewfinder field of view, greater than a size before the change in the viewfinder magnification and a size after the change in the viewfinder magnification, while the viewfinder magnification is changed.

It is preferable that the electronic display panel has a liquid crystal panel for displaying the information and a backlight unit for illuminating the liquid crystal panel from behind. In this case, the luminance changing section is a backlight controller for controlling emission luminance of the backlight unit.

A plurality of pixels are arranged in the electronic display panel. The luminance changing section is a control circuit for controlling on and off of each pixel in the electronic display panel, and changes luminance of the electronic display panel based on blinking time of the pixel.

A method for changing luminance of displayed information of the present invention is applied to a variable magnification viewfinder device provided independently from an imaging system comprising a taking lens and a solid state image sensor. The variable magnification viewfinder device allows observation of a viewfinder image together with the displayed information displayed on an electronic display panel. The method comprises a viewfinder magnification changing step and a luminance changing step. In the viewfinder magnification changing step, a variable power lens is inserted or retracted into or from a viewfinder optical path between an objective lens and an eyepiece lens in an interlocking manner with an operation for changing a magnification of the taking lens and thereby a viewfinder magnification is changed stepwise. In the luminance changing step, after a change in the viewfinder magnification is commanded and until the insertion or retraction of the variable power lens into or from the viewfinder light path is completed, the luminance of the displayed information displayed on the electronic display panel is made higher than luminance before the change in the viewfinder magnification and luminance after the change in the viewfinder magnification.

In the present invention, the variable power lens is inserted into or retracted from the viewfinder optical path to change the viewfinder magnification. Even if the luminance in the viewfinder field of view is changed or it becomes difficult to observe the viewfinder image, the luminance of the displayed information in the viewfinder field of view changes with the change in the viewfinder magnification. Hence, the displayed information does not become illegible.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1:
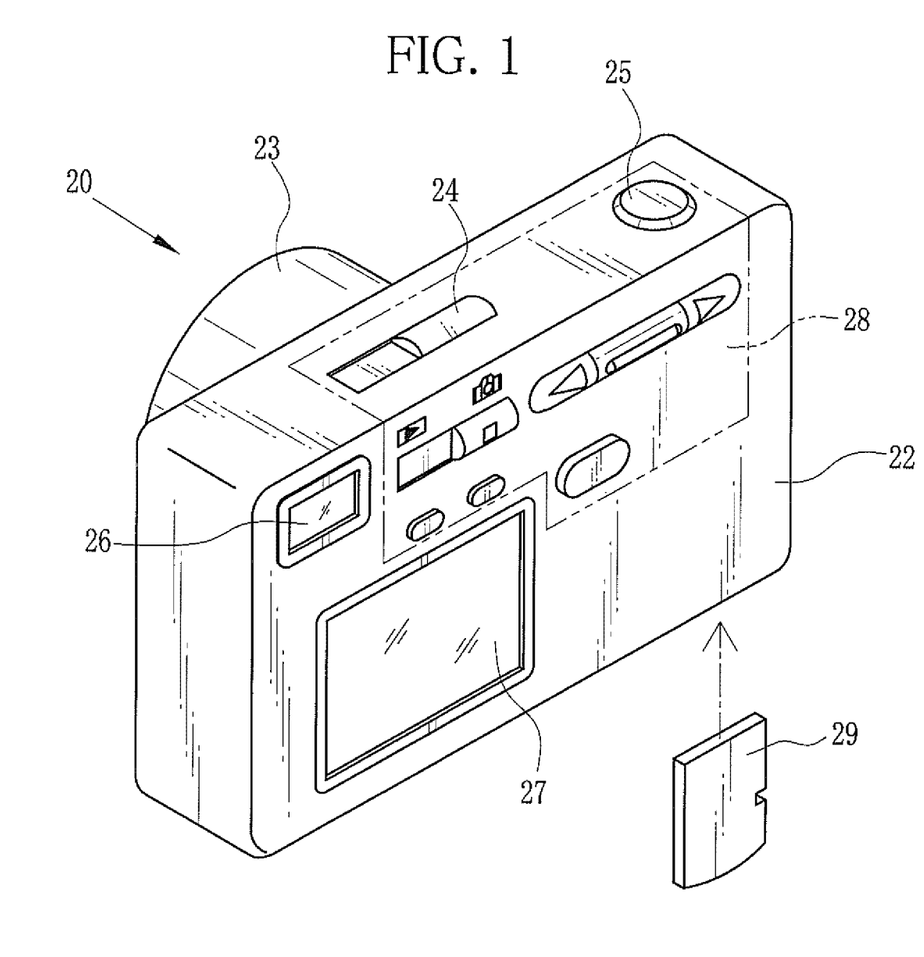
FIG. 1 is a perspective view of a back side of a digital camera provided with a variable magnification viewfinder device of the present invention.

As shown in FIG. 1, a digital camera 20 has a substantially parallelepiped camera body 22. A front surface of the camera body 22 is provided with a taking-lens barrel 23 and a viewfinder objective window (not shown). Aback surface of the camera body 22 is provided with a rear viewfinder window 26 and an LCD panel 27. The LCD panel 27 displays captured image(s) and reproduced image(s). A top surface of the camera body 22 is provided with a power slide switch 24 and a shutter release button 25. The back surface of the camera body 22 is provided with a plurality of operation members. The power slide switch 24, the shutter release button 25, and the operation members constitute an operation section 28. An undersurface of the camera body 22 is provided with a slot (not shown). A memory card 29 is inserted into the slot in a detachable manner. Image data of a captured image is written into the memory card 29.

Figure 2:
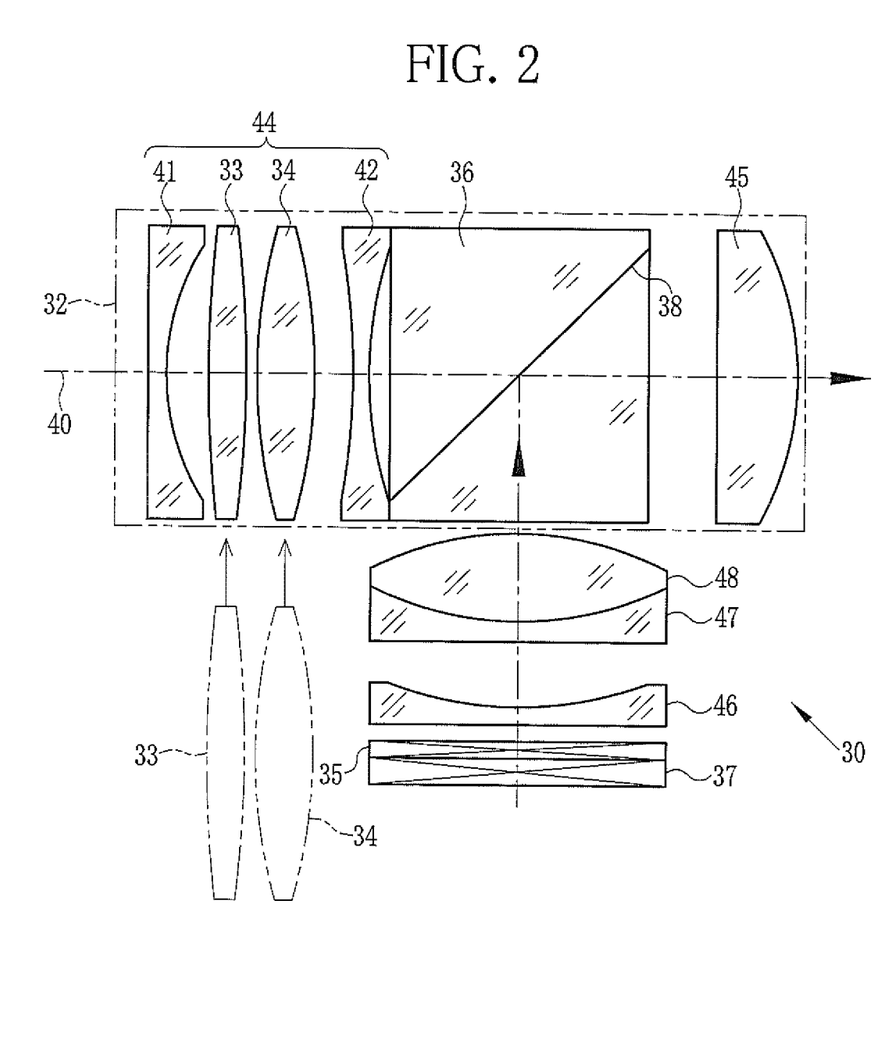
FIG. 2 is a cross-sectional view illustrating a viewfinder optical system.

As shown in FIG. 2, a variable magnification viewfinder device 30 comprises a variable magnification viewfinder optical system 32, a viewfinder driver 43 (see FIG. 3) for driving variable power lenses 33 and 34, a liquid crystal panel (electronic display panel) 35 that displays information related to image capture, a prism (optical path member) 36, and a backlight unit (display light source) 37 having an LED that illuminates the liquid crystal panel 35 from a back side. The prism allows displaying the information, displayed on the liquid crystal panel 35, in a field of view of the variable magnification viewfinder optical system 32. Note that a light-emitting display device such as an organic EL may be used instead of the liquid crystal panel 35.

The variable magnification viewfinder optical system 32 is of a reverse-Galilean type and composed of an objective lens group 44 and an eyepiece lens 45. The objective lens group 44 has two objective lenses 41 and 42 and two variable power lenses 33 and 34. The variable power lenses 33 and 34 are insertable and removable (retractable). The prism 36 having a half mirror 38 is disposed between the objective lens group 44 and the eyepiece lens 45. Light from a subject is incident on the objective lens 41 and exits from the eyepiece lens 45 through the variable magnification viewfinder optical system 32. Thereby the light forms a virtual image of the subject on an eye's retina. Note that the variable magnification viewfinder optical system 32 may be a real image type.

The viewfinder magnification of the variable magnification viewfinder optical system 32 is changed by inserting or retracting the variable power lenses 33 and/or 34 into or from a viewfinder optical path 40. The viewfinder magnification is doubled when the single variable power lens 33 is inserted into the viewfinder optical path 40 and the viewfinder magnification is tripled when the two variable power lenses 33 and 34 are inserted into the viewfinder optical path 40, as compared with the viewfinder magnification without the use of the variable power lenses 33 and 34.

Displayed information on the liquid crystal panel 35 illuminated by the display light source 37 is incident on the prism 36 through lenses 46 to 48, and then reflected by the half mirror 38 to enter the eyepiece lens 45. The displayed information passes through the eyepiece lens 45 and enters an eye. The displayed information and a viewfinder image from the objective lens group 44 are combined with each other and viewed simultaneously in the viewfinder field of view.

Figure 3:
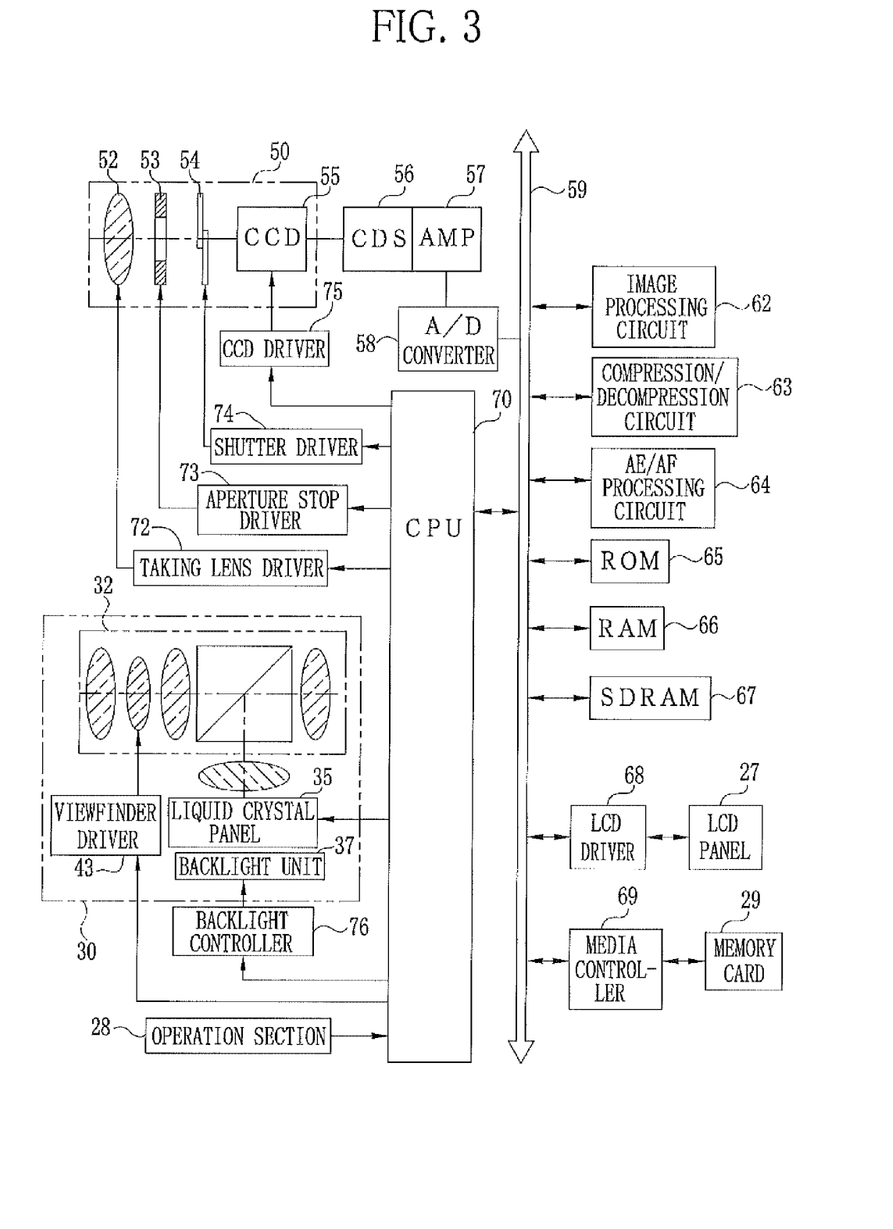
FIG. 3 is a schematic view illustrating configuration of the digital camera.

As shown in FIG. 3, an imaging system 50 comprises a taking lens 52 having a zooming function, an aperture stop device 53, a shutter device 54, and a CCD (solid state image sensor) 55, and captures a subject image with the CCD 55. The taking lens 52 is illustrated as a single lens for the sake of convenience. The taking lens 52 has a variable power lens for changing imaging magnification, a correcting lens, and a focusing lens. The correcting lens performs focus adjustment when the subject distance changes and performs correction to avoid out-of-focus images during changing the imaging magnification. Note that the focusing lens may be used as a substitute for the correcting lens.

A time-series output signal (image signal) from the CCD 55 is transmitted to a data bus 59 through a CDS (correlated double sampling circuit) 56, an AMP (amplifying circuit) 57, and an A/D converter 58. The data bus 59 is connected to an image processing circuit 62, a compression/decompression circuit 63, an AE/AF processing circuit 64, a ROM 65, a RAM 66, an SDRAM 67, an LCD driver 68 for controlling the LCD panel 27, a media controller 69, and a CPU 70.

The CPU 70 reads out a sequence program which is stored in the ROM 65 and expands it on the RAM 66, being a working memory. The output signal from the CCD 55 is inputted to the CDS 56 and then outputted as a three-color signal of R, G, and B, which corresponds to a stored charge amount of each light receiving element in the CCD 55. The three-color signal from the CDS 56 is amplified in the AMP 57, and converted into three-color image data in the A/D converter 58. When a still image is captured, the tree-color image data from the A/D converter 58 is temporarily stored in the SDRAM 67 through the data bus 59.

In the case of a still image, the image processing circuit 62 reads out the image data from the SDRAM 67 and performs various image processes such as tone conversion, gamma correction processing, and color correction processing on the image data. The image processing circuit 62 writes processed image data into the SDRAM 67. In the case of through images (moving images), the image processing circuit 62 performs simple image processes on the three-color image data from the A/D converter 58, and writes processed three-color image data into the SDRAM 67. The SDRAM 67 has two memory areas for the through images. While a through image is read out from one of the memory areas, a subsequent through image is written into the other memory area.

The through image in the SDRAM 67 is converted into an analog composite signal in the LCD driver 68. The composite signal is transmitted to the LCD panel 27. Thereby the through image is displayed on the LCD panel 27. The still image which has been subjected to the image processes and stored in the SDRAM 67 is transmitted and compressed in a predetermined compression format (for example, JPEG format) in the compression/decompression circuit 63. The compressed still image is recorded in the memory card 29 by the media controller 69.

The CPU 70 is connected to a taking lens driver 72, an aperture stop driver 73, a shutter driver 74, and a CCD driver 75. The taking lens driver 72 has motors for performing the focus adjustment and zooming of the taking lens 52 and drivers for controlling the respective motors. The aperture stop driver 73 has a motor for driving the aperture stop device 53 and a driver for controlling the motor. The shutter driver 74 has a motor for driving the shutter device 54 and a driver for controlling the motor. The operation section 28 has operation members such as the power slide switch 24 and the shutter release button 25. Operation signals from the operation members are inputted to the CPU 70.

A predetermined area inside an image capture field, normally, a center area is set as a focus area. The AE/AF processing circuit 64 determines the focus state of the taking lens 52 based on a signal corresponding to the focus area, of the output signals of the CCD 55. The CPU 70 moves the taking lens 52 through the taking lens driver 72 to perform the focus adjustment when the taking lens 52 is out of focus. The AE/AF processing circuit 64 measures the subject brightness based on the output signal from the CCD 55 and calculates an aperture value and a shutter speed. The aperture stop driver 73 controls the aperture stop device 53 in accordance with the aperture value. The shutter driver 74 drives the shutter device 54 in accordance with the shutter speed to control exposure time in a still image capture.

Figure 4:
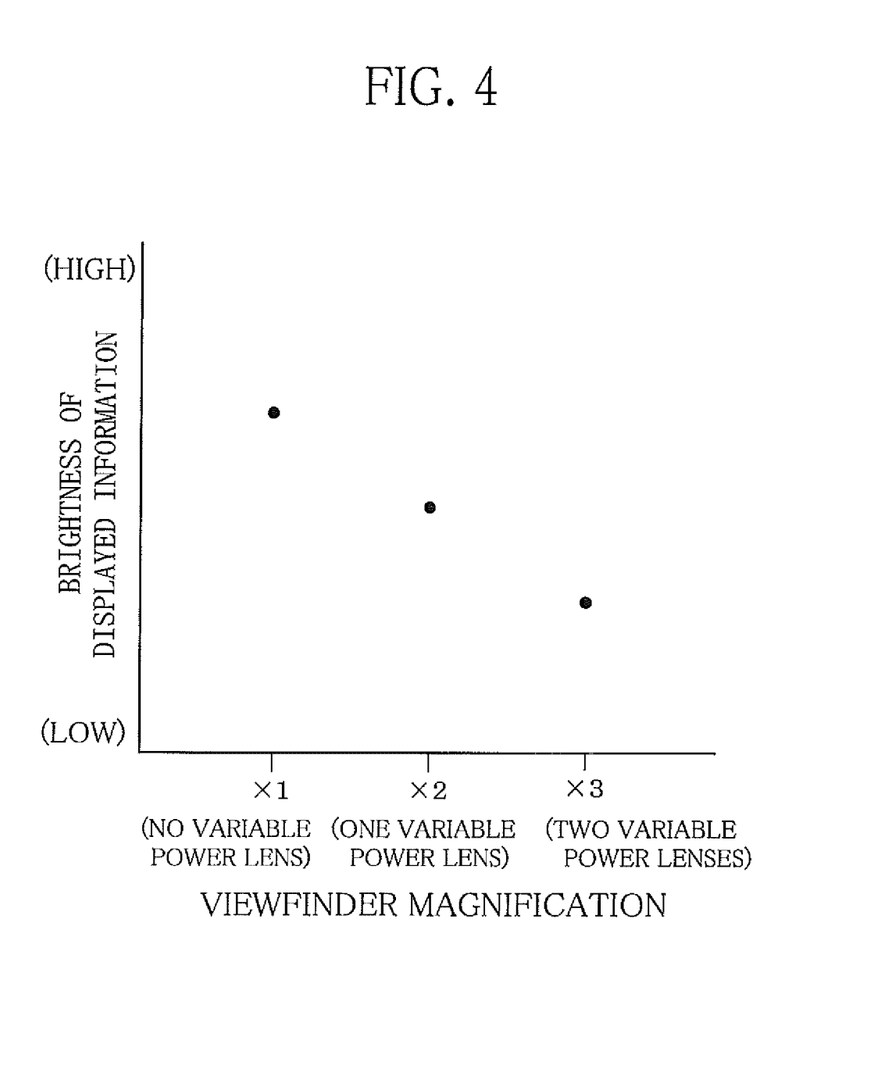
FIG. 4 is a graph illustrating a relationship between viewfinder magnification and brightness of displayed information.

The liquid crystal panel 35 is illuminated from behind by the backlight unit (the display light source) 37. The brightness of the backlight illumination determines the luminance of the information displayed on the liquid crystal panel 35. The brightness of the viewfinder image varies with the viewfinder magnification, so that the displayed information with the constant luminance may become too bright or too dark relative to the viewfinder image. Hence it becomes difficult to observe the viewfinder image and the displayed information at a time. For this reason, as shown in FIG. 4, the CPU 70 controls emission luminance of the backlight unit 37 through a backlight controller 76 so as to change the luminance of the information, which is displayed on the liquid crystal panel 35, with the viewfinder magnification. For example, the viewfinder image gets dark when the viewfinder magnification is increased by inserting the variable power lenses 33 and/or 34. In this case, the backlight unit 37 is darkened to darken the displayed information.

The viewfinder driver 43 for moving the variable power lenses 33 and 34 may be a manual type or an automatic type. In the case of the automatic type, the viewfinder driver 43 automatically inserts or retracts the variable power lenses 33 and/or 34 to adjust the viewfinder magnification, interlocked mechanically or electrically with an operation for changing the imaging magnification of the imaging system 50. Based on the insertion or the retraction of the variable power lenses 33 and/or 34, the CPU 70 automatically adjusts the emission luminance of the backlight unit 37.

Next, an operation of the above embodiment is described. When the power of the digital camera 20 is turned on, the shutter device 54 opens and the CCD 55 starts photoelectric conversion. The CCD driver 75 drives the CCD 55 at a predetermined cycle. Thereby the CCD 55 captures a through image of the subject. The through image is transmitted to the image processing circuit 62 through the CDS 56, the AMP 57, and the A/D converter 58. The through image is subjected to simple image processing in the image processing circuit 62 and then written into the SDRAM 67. Thereafter, the image data is read out from the SDRAM 67 and transmitted to the LCD panel 27 through the LCD driver 68. Thereby the through image is displayed. Note that, while the through image is displayed, a through image to be subsequently displayed is written into the SDRAM 67.

The AE/AF processing circuit 64 performs the AF control and the AE control at predetermined cycle (s) while the through images are displayed. In the AF control, the focus state of the taking lens 52 is determined based on an image-forming state of the CCD 55. When the taking lens 52 is out of focus, the CPU 70 moves the focusing lens of the taking lens 52 through the taking lens driver 72 to perform the focus adjustment. In the AE control, the subject brightness is measured based on a green signal from the CCD 55. Based on the subject brightness, the CPU 70 drives the aperture stop device 53 through the aperture stop driver 73 to adjust an aperture diameter.

When the shutter release button of the operation section 28 is half-pressed, the AE/AF processing circuit 64 is activated and performs the focus adjustment. The AE/AF processing circuit 64 calculates the exposure amount to determine the aperture value and the shutter speed. When the shutter release button is fully pressed, the CPU 70 forcefully resets the CCD 55 through the CCD driver 75, and then allows the CCD 55 to start storing charges. After a lapse of the exposure time that corresponds to the shutter speed set by the AE/AF processing circuit 64, the shutter device 74 closes to end the still image capture. The still image is read out from the CCD 55 and temporarily written into the SDRAM 67 through the CDS 56, the AMP 57, and the A/D converter 58. After the still image is read out, the CPU 70 opens the shutter device 54 through the shutter driver 74 and allows capturing the through images.

The still image in the SDRAM 67 is read out by the image processing circuit 62 and subjected to various image processes, and then rewritten into the SDRAM 67. The processed still image in the SDRAM 67 is transmitted to the compression/decompression circuit 63 and subjected to image compression, and then recorded in the memory card 29.

During the image capture of the through images, the size and the position of the subject image relative to the screen are checked while the variable magnification viewfinder device 30 is viewed. In order to change the size of the subject image, a zoom button in the operation section 28 is operated to change the imaging magnification (focal length) of the taking lens 52. Thereby the taking lens driver 72 moves the variable power lens in the optical axis direction to change the imaging magnification and the correcting lens or the focusing lens moves in the optical axis direction to correct a shift of the focus position caused by the change in the imaging magnification.

For example, a range for changing the imaging magnification is categorized into three levels. Based on a position signal of the variable power lens, the CPU 70 determines the level in which the taking lens 52 is included. The CPU 70 automatically changes the viewfinder magnification in three levels, which correspond to the levels of the imaging magnification. At this time, the CPU 70 commands the viewfinder driver 43 to change the viewfinder magnification and allows the viewfinder driver 43 to insert or retract the variable power lenses 33 and/or 34. When the imaging magnification is low, both of the variable power lenses 33 and 34 are retracted from the viewfinder optical path 40 and the viewfinder magnification is also low. When the imaging magnification is at an intermediate level, the variable power lens 33 is inserted into the viewfinder optical path 40 and the viewfinder magnification is also at the intermediate level. When the imaging magnification is high, both of the variable power lenses 33 and 34 are inserted into the viewfinder optical path 40 and the viewfinder magnification is also high.

The luminance of the information displayed on the liquid crystal panel 35 is changed in accordance with the change in the viewfinder magnification. During the change, namely, after the change in the viewfinder magnification is commanded and until the completion of insertion or retraction of the variable power lenses 33 and/or 34 into or from the viewfinder optical path 40, the luminance of the information displayed on the liquid crystal panel 35 is higher than those before and after the change in the viewfinder magnification.

Figure 5:
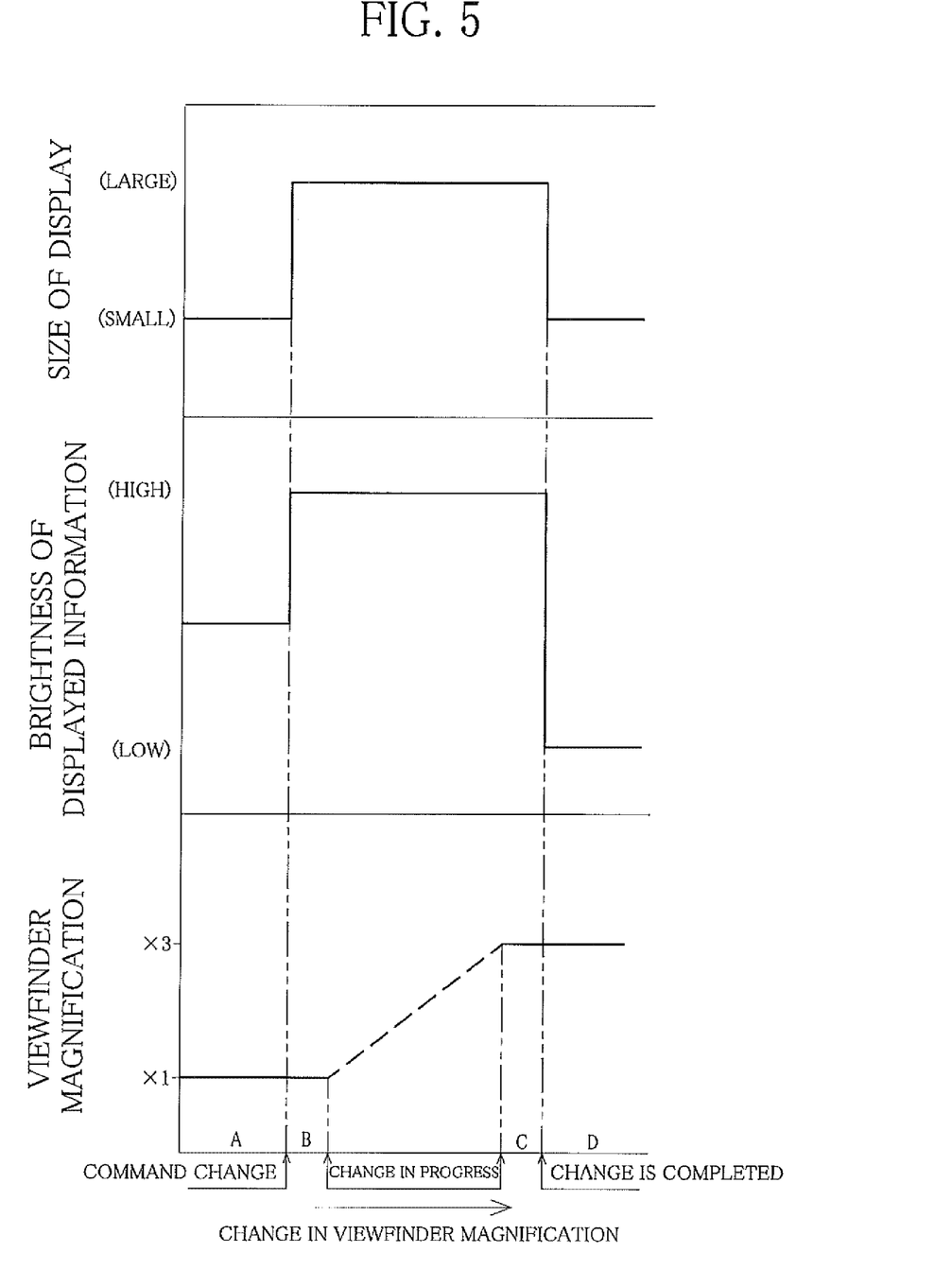
FIG. 5 is a timing chart for changing the viewfinder magnification.

In FIG. 5, in a period A, a magnification display "×1", which denotes that the imaging system 50 is at the wide angle end, is displayed in the field of view of the variable magnification viewfinder device 30. When the imaging magnification is significantly changed by zooming of the taking lens 52, a change to a magnification display "×3" is commanded. When the change in the display is commanded, the variable power lenses 33 and 34 are inserted into the viewfinder optical path 40 after the period B. Thereby the viewfinder image in the viewfinder field of view is magnified. After a period C, which is a period after the viewfinder image is magnified, a period D is reached. The period D is a period after the completion of the change in the viewfinder magnification.

In the period D, which is a period after the completion of the change in the viewfinder magnification, the brightness (luminance) of the displayed information is lower than that of the displayed information before the change (in the period A). During the change in the viewfinder magnification (that is, between the periods B and C), the displayed information is significantly brighter than the displayed information before the change and the displayed information after the change. The magnification display is changed to "×3". The size of the magnification display is increased several-fold as compared with the size of the magnification display before or after the change in the viewfinder magnification. Thereby it is emphasized that the viewfinder magnification is in the process of changing. Note that the CPU 70 changes the size of the magnification display "×1", "×3", or the like.

Figure 6:
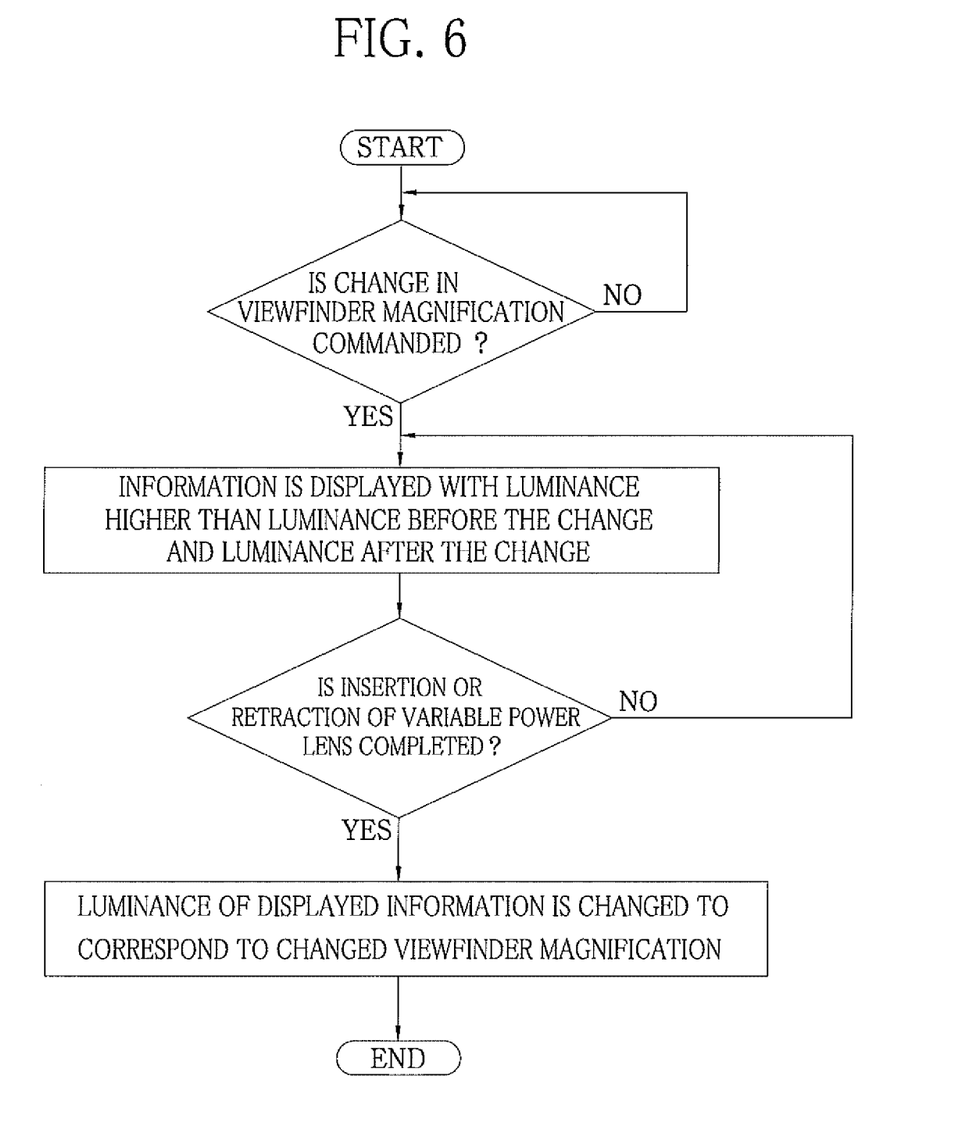
FIG. 6 is a flowchart illustrating changing luminance of displayed information.
Figure 7:
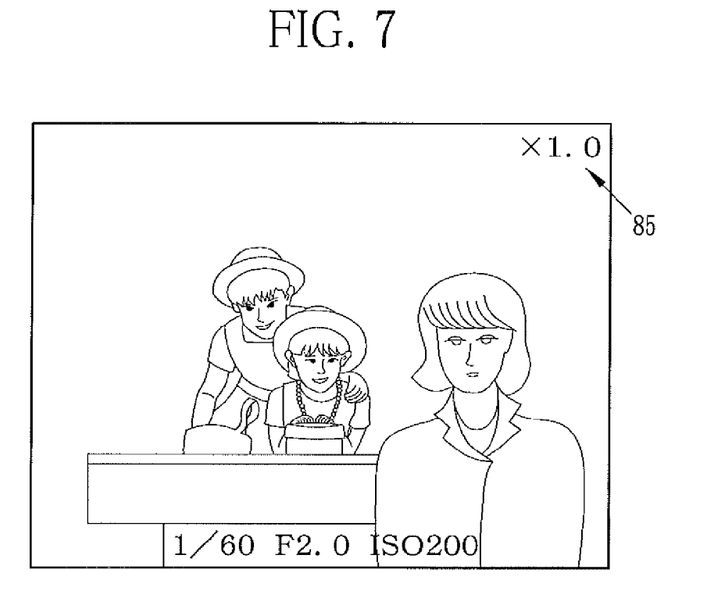
FIG. 7 illustrates an example of a viewfinder field of view.
Figure 8:
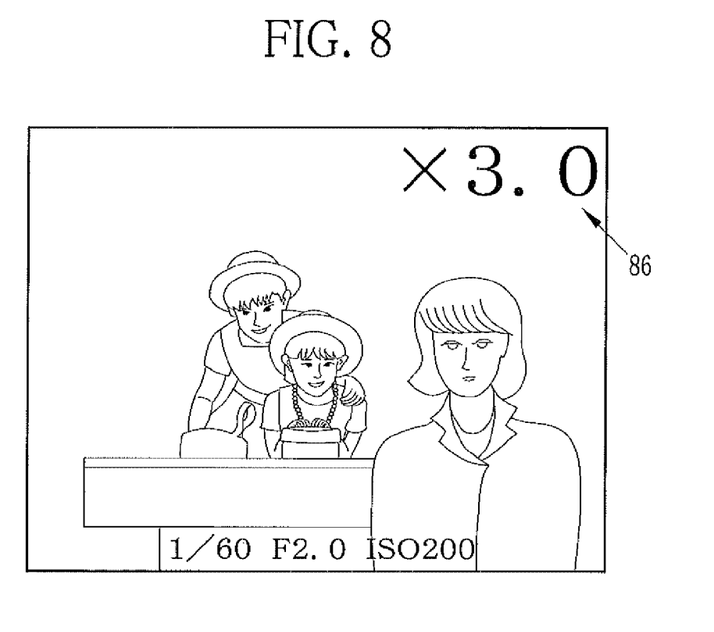
FIG. 8 illustrates displayed information immediately after a change in the viewfinder magnification is commanded.
Figure 9:
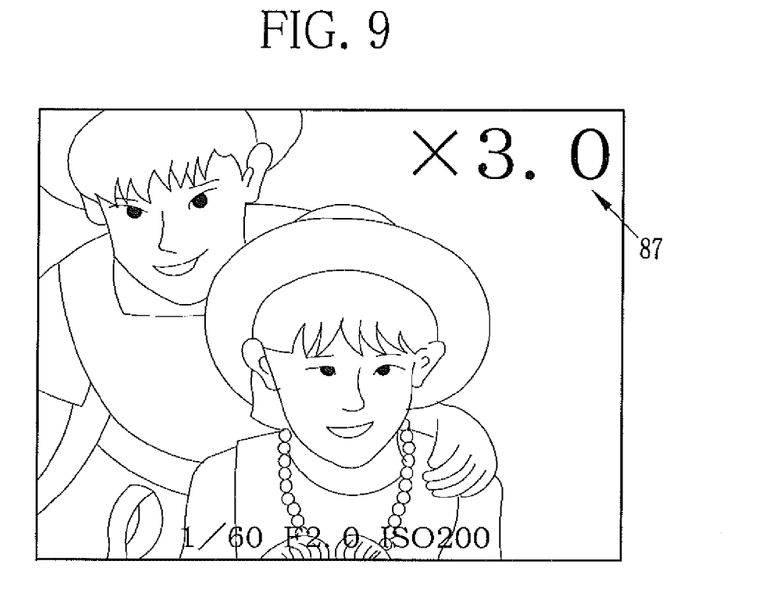
FIG. 9 illustrates the displayed information during changing the viewfinder magnification.

FIG. 6 illustrates steps for changing the size of the displayed information and the luminance. In the period A of the FIG. 5, the viewfinder field of view is in a state shown in FIG. 7. The magnification display "×1.0" which is denoted by a character 85 is displayed in the viewfinder field of view. When the CPU 70 commands the change in the viewfinder magnification, the period B is reached. The viewfinder field of view is in a state shown in FIG. 8. As shown by a character 86, the magnification display is changed to "×3.0" and the display size of "×3.0" is enlarged and the luminance is significantly increased. Then, the insertion of the variable power lenses 33 and 34 into the viewfinder optical path 40 is started. When the viewfinder magnification is changed and the period C in FIG. 5 is reached, the viewfinder field of view is in a state illustrated in FIG. 9. In this viewfinder field of view, the viewfinder image is magnified. The magnification display "×3.0" denoted by a character 87 is also displayed in the large size.

Figure 10:
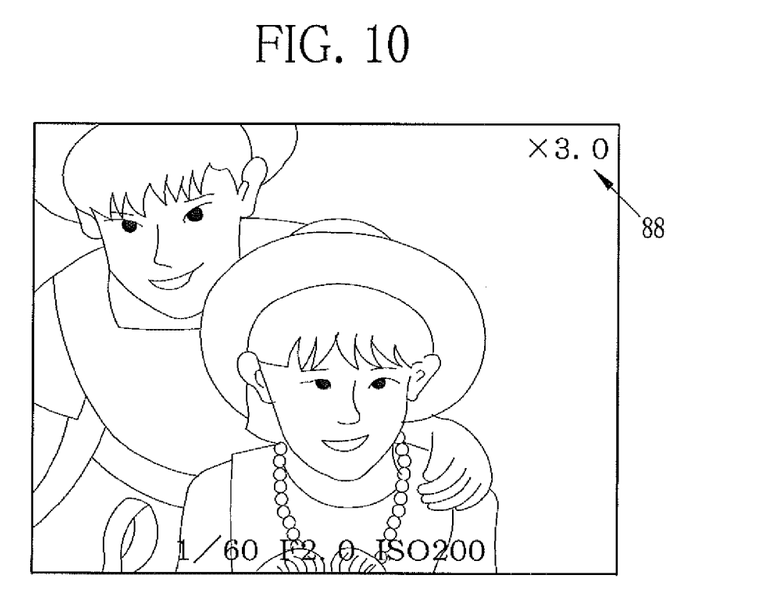
FIG. 10 illustrates the displayed information immediately after the completion of changing the viewfinder magnification.

The completion of the insertion or retraction of the variable power lenses 33 and 34 (completion of the change in the viewfinder magnification) is detected. The completion of the insertion or retraction can be detected based on a stroke of the motor of the viewfinder driver 43 or by a sensor (a microswitch or an optical sensor) for detecting the variable power lenses 33 and 34. Upon the detection, the period D in FIG. 5 is reached. The viewfinder field of view is in a state illustrated in FIG. 10. The display size of the magnification display "×3.0", which is denoted by a character 88, returns to the normal size as that displayed before the change in the viewfinder magnification. The luminance of the magnification display becomes lower than that before the change (the period A in FIG. 5). Thereby the brightness of the entire viewfinder field of view and the brightness of the displayed information are changed along with the change in the viewfinder magnification without discomfort.

Figure 11:
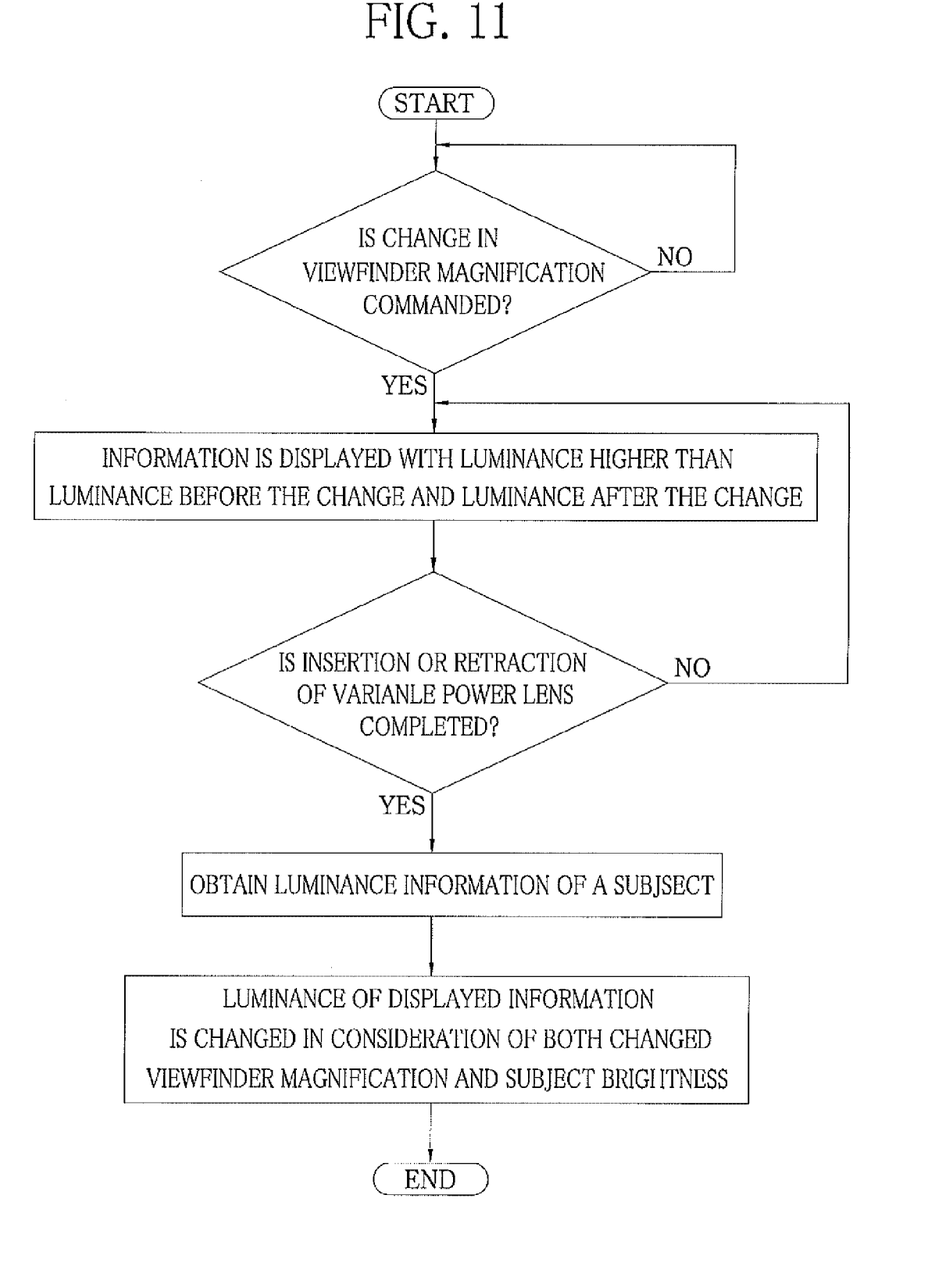
FIG. 11 is a flowchart illustrating an example in which the luminance of the displayed information is changed in consideration of subject brightness and the viewfinder magnification.

A flowchart in FIG. 11 illustrates an example in which the luminance of the displayed information is changed in consideration of the viewfinder magnification and subject brightness. In this example, legibility of the displayed information is improved even if the subject is extremely bright or dark. In the case where the subject is bright, the viewfinder image is bright even if the viewfinder magnification is high. When the viewfinder image is bright, brightly displayed information is legible. The luminance of the displayed information is changed by adjusting the emission luminance of the backlight unit 37 in consideration of the subject brightness, which has been calculated by the AE/AF processing circuit 64, and the viewfinder magnification. In this example, the luminance of the backlight unit 37 may be changed with the subject brightness even if the viewfinder magnification is not changed.

In the case where the backlight unit 37 is continuously turned on, the luminance of the displayed information is changed by adjusting the luminance of the backlight unit 37. Alternatively, the liquid crystal panel 35 may be turned on and off to blink the pixels while the luminance of the backlight unit 37 is kept constant. In this case, a duty ratio changes, resulting in a change in the luminance of the displayed information. For example, when a lighting time in one cycle is extended by increasing the duty ratio, the luminance of the displayed information increases. The duty ratio is controlled by the CPU 70. The duty ratio may be controlled by a liquid crystal panel control circuit.

The number of levels in the range for changing the imaging magnification are not limited to three and may be determined as necessary. The levels of the magnification of the variable magnification viewfinder device change with the levels in the range for changing the imaging magnification. In the case where the taking lens is a zoom lens, it is preferable to change the viewfinder magnification continuously, so that the variable magnification viewfinder device may also employ a zoom lens. In this case, the luminance of the displayed information is changed continuously with the viewfinder magnification.

Various changes and modifications are possible in the present invention and may be understood to be within the present invention.

What is claimed is:

1. A variable magnification viewfinder device comprising:
a variable magnification viewfinder optical system provided independently from an imaging system comprising a taking lens and a solid state image sensor, the variable magnification viewfinder optical system inserting or retracting a variable power lens into or from a viewfinder optical path between an objective lens and an eyepiece lens in an interlocking manner with an operation for changing a magnification of the taking lens and changing a viewfinder magnification stepwise;
an electronic display panel for displaying information related to imaging;
an optical path member for introducing the information displayed on the electronic display panel to a viewfinder field of view from a position closer to the eyepiece lens than a position at which the variable power lens is inserted or retracted; and
a luminance changing section for automatically changing luminance of the information displayed on the electronic display panel, in accordance with the change in the viewfinder magnification.

2. The variable magnification viewfinder device according to claim 1, wherein the luminance changing section reduces the luminance of the information displayed on the electronic display panel as the viewfinder magnification increases.

3. The variable magnification viewfinder device according to claim 2, wherein the luminance changing section allows displaying viewfinder magnification information with set luminance, which is determined stepwise in accordance with the viewfinder magnification, on the electronic display panel before and after the change in the viewfinder magnification, and the luminance changing section allows displaying the viewfinder magnification information with luminance higher than any of the set luminances while the viewfinder magnification is changed,
and the electronic display panel displays the viewfinder magnification information at a predetermined display size before and after the change in the viewfinder magnification, and the electronic display panel displays at least a part of the viewfinder magnification information at a size larger than the predetermined display size while the viewfinder magnification is changed.

4. The variable magnification viewfinder device according to claim 1, wherein the optical path member is a prism disposed between the objective lens and the eyepiece lens, and combines a viewfinder image formed by the objective lens with the information.

5. The variable magnification viewfinder device according to claim 1, wherein the luminance changing section makes the luminance of the information, which is displayed on the electronic display panel, higher than luminance before the change in the viewfinder magnification and luminance after the change in the viewfinder magnification, while the viewfinder magnification is changed.

6. The variable magnification viewfinder device according to claim 5, wherein the electronic display panel makes a size of at least a part of the information, which is displayed in the viewfinder field of view, greater than a size before the change in the viewfinder magnification and a size after the change in the viewfinder magnification, while the viewfinder magnification is changed.

7. The variable magnification viewfinder device according to claim 1, wherein the electronic display panel has a liquid crystal panel for displaying the information and a backlight unit for illuminating the liquid crystal panel from behind.

8. The variable magnification viewfinder device according to claim 7, wherein the luminance changing section is a backlight controller for controlling emission luminance of the backlight unit.

9. The variable magnification viewfinder device according to claim 7, wherein a plurality of pixels are arranged in the electronic display panel, and
the luminance changing section is a control circuit for controlling on and off of the each pixel in the electronic display panel, and changes luminance of the electronic display panel based on blinking time of the pixel.

10. A method for changing luminance of displayed information in a variable magnification viewfinder device provided independently from an imaging system comprising a taking lens and a solid state image sensor, the variable magnification viewfinder device allowing observation of a viewfinder image together with the displayed information displayed on an electronic display panel, the method comprising the steps of:

inserting or retracting a variable power lens into or from a viewfinder optical path between an objective lens and an eyepiece lens in an interlocking manner with an operation for changing a magnification of the taking lens and changing a viewfinder magnification stepwise; and making the luminance of the displayed information, which is displayed on the electronic display panel, higher than luminance before a change in the viewfinder magnification and luminance after the change in the viewfinder magnification, after the change in the viewfinder magnification is commanded and until the insertion or retraction of the variable power lens into or from the viewfinder light path is completed.

\* \* \* \* \*